United States Patent [19]
Capozzola et al.

[11] Patent Number: 5,338,457
[45] Date of Patent: Aug. 16, 1994

[54] REMOVAL OF ALUMINUM AND SULFATE IONS FROM AQUEOUS SOLUTIONS

[75] Inventors: John Capozzola, Syracuse; David K. Kennedy, Constantia, both of N.Y.

[73] Assignee: General Chemical Corporation, Parsippany, N.J.

[21] Appl. No.: 49,545

[22] Filed: Apr. 19, 1993

[51] Int. Cl.$^5$ .............................................. B01D 61/00
[52] U.S. Cl. ................................. 210/652; 210/651; 210/641; 210/758; 210/805
[58] Field of Search ............... 210/650, 651, 652, 758, 210/805, 641, 681, 683, 688; 204/182.4; 423/117, 121, 128

[56] References Cited

U.S. PATENT DOCUMENTS

| | | | |
|---|---|---|---|
| 1,300,417 | 4/1919 | Laist et al. | 423/117 |
| 2,152,597 | 3/1939 | Lurie | 423/117 |
| 3,756,408 | 9/1973 | Spatz et al. | 210/96 |
| 3,839,206 | 10/1974 | Welch | 210/259 |
| 4,014,787 | 3/1977 | Shorr | 210/651 |
| 4,036,749 | 7/1977 | Anderson | 210/359 |
| 4,046,686 | 9/1977 | Goldstein | . |
| 4,188,291 | 2/1980 | Anderson | . |
| 4,200,526 | 4/1980 | Johnson et al. | 210/652 |
| 4,276,176 | 6/1981 | Shorr | 210/651 |
| 4,382,010 | 5/1983 | Lurie | 423/117 |
| 4,668,485 | 5/1987 | Cresswell et al. | 423/121 |
| 4,786,482 | 11/1988 | The et al. | 210/651 |

FOREIGN PATENT DOCUMENTS 52-52818  4/1977  Japan ............................... 210/651

OTHER PUBLICATIONS

General Chemical Brochure, Alum, 1987.

Primary Examiner—Robert A. Dawson
Assistant Examiner—Ana M. Fortuna
Attorney, Agent, or Firm—Arthur J. Plantamura

[57] ABSTRACT

A process for removing aluminum and sulfate values from an aqueous solution containing the same which comprises passing the solution through a semi-permeable membrane in a pressure vessel. The permeate solution is depleted of aluminum and sulfate ions and the concentrate solution is concentrated in aluminum and sulfate ions. The concentrate solution can be re-used in alum manufacture and the permeate solution can be discharged into public waterways without further purification.

19 Claims, 1 Drawing Sheet

REMOVAL OF ALUMINUM AND SULFATE IONS FROM AQUEOUS SOLUTIONS

This invention relates to removal of aluminum and sulfate ions from aqueous solutions. More particularly, this invention relates to the removal of aluminum and sulfate ions and the production of high quality water from waste water.

BACKGROUND OF THE INVENTION

As federal, state and local requirements for water purity become more stringent, and as the level of environmental concerns mounts ever higher in general, means of purifying water that reaches ground, rivers and lakes to ever higher levels continue to be sought.

The manufacture of aluminum sulfate (alum) solutions is not exempt from these concerns. A present process for manufacturing aluminum sulfate or other aluminum-bearing ores is to digest bauxite ores containing hydrated alumina ($Al_2O_3\ H_2O$) with sulfuric acid. The maximum commercial concentration of the aluminum sulfate (alum) produced is about 48.5% by weight.

Even with careful water washing of the bauxite residue however, some of the alum created during manufacture is entrained with some of the wash water on the residue, which residue generally is transferred to containment ponds. This water will then percolate into the soil, carrying with it aluminum and sulfate ions in measurable amounts, unless they are removed from the wash waters first. In order to meet, and preferably to exceed, the minimum levels set by various federal and state standards for drinking water prior to disposal of such water into the public waterways, these ions must be removed from the entrained water.

The present federal drinking water standard requires a maximum of 250 parts per million (hereinafter ppm) of sulfate ion ($SO_4^=$) and 0.3 ppm of iron. States such as Florida mandate that the level of aluminum ion ($Al^{+3}$) be no more than 1.48 ppm.

Further, in order to improve the overall economies of this process, the aluminum in the waste water should be recoverable in a form so that it can be re-used in the aluminum sulfate manufacturing process.

The above-described present process for aluminum sulfate manufacturing produces waste water solutions that contain about 56 ppm of iron, 18,400 ppm of sulfate and 2900 ppm of aluminum, and thus these solutions must be purified before they can be discharged into the public waters. Further, the pH of this by-product solution is only about 3.3, whereas drinking water standards require that water have a pH of between 6.5–8.5. Thus the waste water solution must also be treated, as with an alkali, to increase the pH to within the designated range.

At present the waste water solutions are fed to mud ponds where the particulates and certain ions are removed as the water seeps into the ground water. However, such a process is not controllable and ions such as aluminum are lost and cannot be recovered from such mud ponds.

It is known that aluminum and sulfate can be removed from waste water by treatment with barium hydroxide ($Ba(OH)_2$). As the pH of water increases, the aluminum precipitates out as aluminum hydroxide. The result is that when the water meets the pH standards, the aluminum and sulfate have been removed from the water sufficiently to meet present-day drinking water standards. The resultant hydroxide solids can be recovered by filtration. However, in order to recover the precipitated aluminum from the solids, extensive processing must be done, which is expensive and adds to the cost of the process.

Aluminum and sulfate can also be removed from waste water by treatment with lime ($Ca(OH)_2$). However, this produces an aqueous solution having a high concentration of sulfate (1750 ppm) and up to 2000 ppm of calcium, in addition to aluminum. This level of calcium is believed to be too high for re-use of this solution in aluminum sulfate manufacturing, and thus the calcium must be removed, which is both difficult and very expensive.

The great disadvantage of both of these latter known processes is that reagents are added to the waste water solution, which reagents in turn must be removed before the water can be allowed to be discharged. Further, the aluminum is in a form that is difficult and expensive to re-use in the aluminum sulfate manufacturing process. Thus the search for an economic process that produces high quality water from aluminum-contaminated waste water, which can be discharged into public waterways without further treatment, and that recovers aluminum in a form so that it can readily be re-cycled to the manufacturing process, has continued.

SUMMARY OF THE INVENTION

We have found that aluminum and sulfate ions can be removed from waste water solutions, particularly waste water from alum manufacture, efficiently and effectively, producing, with an adjustment of pH, a) a purified water that can be discharged into the public waterways and that meets all existing standards for drinking water, and b) a solution having a high concentration of aluminum and sulfate that can be recycled to an aluminum manufacturing process, using reverse osmosis.

DETAILED DESCRIPTION OF THE INVENTION

Figure 1:
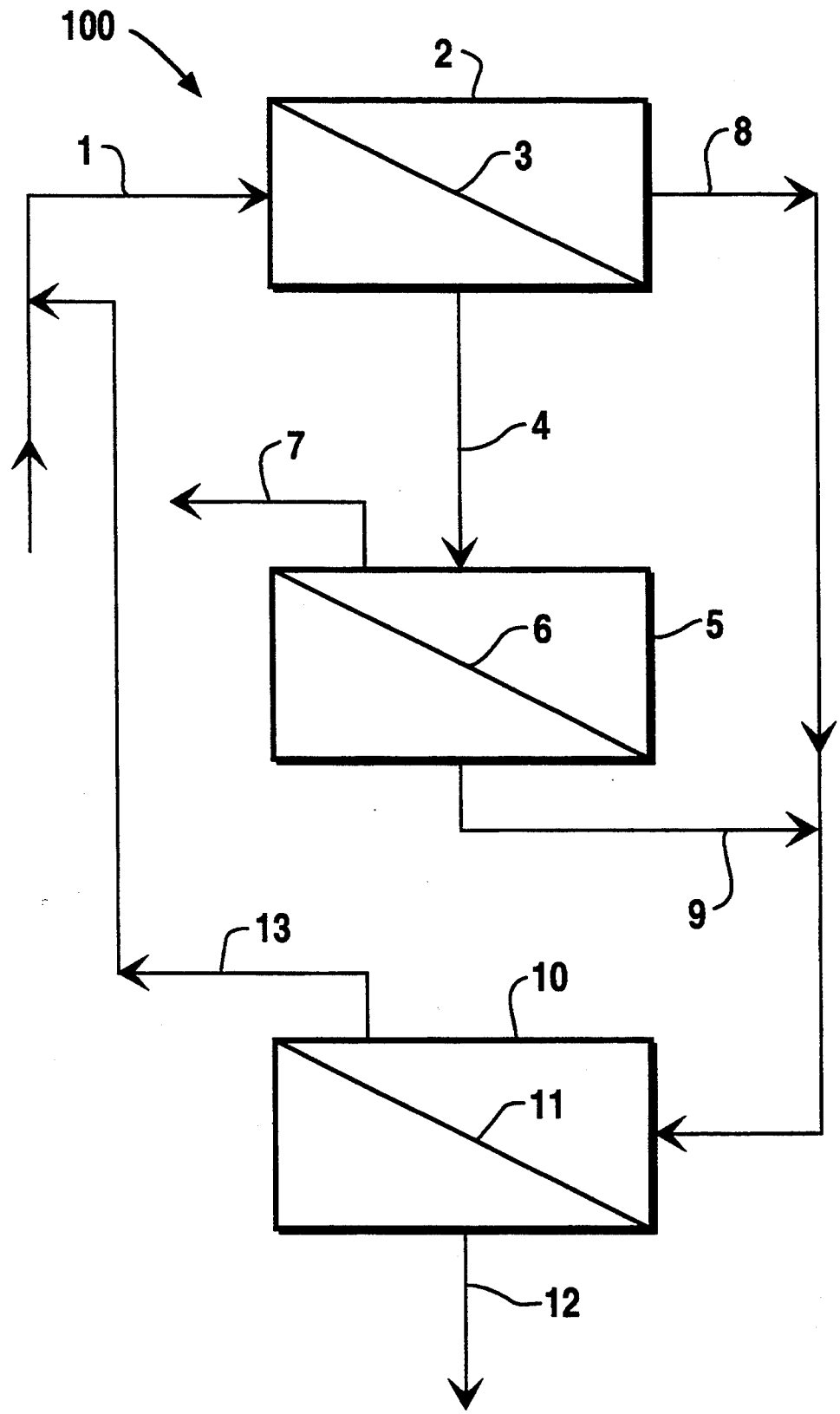
FIG. 1 is a flow diagram of the preferred process of the present invention.

Reverse osmosis is a known process whereby an aqueous solution containing various anions and cations is passed through a semi-permeable membrane under pressure. The water from which various anions and cations are removed during passage through the membrane is known as the permeate, while a solution containing an increased concentration of anions and cations that remains on the membrane is known as the concentrate. The pressure applied to the separation chamber containing the membrane forces water through the pores of the membrane, while entrained particles and ions are retained on the membrane.

The most widely used, commercially available semi-permeable membranes for a reverse osmosis process are cellulose acetate polymers. Reverse osmosis has been in widespread use to desalinate brackish and salty water, but to our knowledge reverse osmosis has not been tried, nor has it generally been deemed possible, to use this technology to remove metals such as aluminum. In any event, the pressure employed for the process must be high enough to overcome the osmotic pressure of the concentrated liquid in order to force the liquid through the polymer. Such membranes have not been utilized heretofore for the present waste waters, cations or anions. That reverse osmosis could be used to produce a concentrated solution of aluminum and sulfate as the concentrate, and pure water as the permeate from which aluminum and sulfate have been removed, or that water of such high purity would be produced from such highly concentrated starting solutions, was highly unexpected.

Waste water solutions from alum manufacture can contain from about 2000–80,000 mg/l of sulfate and from about 200–10,000 mg/l of aluminum. The present process reduces the concentration of sulfate in the permeate solution to about 4– 400 mg/l and reduces the concentration of aluminum to about 1–40 mg/l. The pressure in the chambers in which the membrane is mounted can vary from about 200–1000 psi, and is preferably about 200–600 psi.

In one embodiment of the present process, waste process water containing about 0.3% of aluminum and about 2% of sulfate is passed through a reverse osmosis membrane under pressure of about 200–1000 psi. About 65% recovery of the aluminum is obtained in the resultant concentrate solution in a single pass.

By passage of the recovered permeate solutions through additional reverse osmosis membranes, up to about 95% recovery of aluminum and sulfate can be obtained in the concentrates and almost pure water can be discharged. The combined concentrate solutions, now containing about 1.7% of aluminum, can be recycled to an alum manufacturing process, providing excellent recovery of the aluminum values.

When a single stage reverse osmosis process is employed, the concentrate contains about 15–17% of alum, and thus can be recycled to an aluminum manufacturing process as desired. However, the resultant purified water permeate contains a concentration of about 60 ppm of aluminum, which may be an adequate level of purity for discharge.

The present invention can be further described in the following Examples, but the invention is not to be limited to the details described therein.

EXAMPLE 1

A semi-permeable membrane sold as SG 2540TF by Desalination Systems Co was charged to a pressure chamber maintained at a pressure of 200 psi. An aluminum sulfate waste Desalination Systems Co was charged to a pressure chamber water solution having a pH of 3.8, a sulfate concentration of about 19,400 mg/l, an aluminum concentration of about 2300 mg/l and iron in a concentration of 63 mg/l was passed into the chamber at a rate of about 1130 ml/min for twenty minutes. The total sample treated was about 22,600 ml of the waste water solution. About 15,570 ml of permeate was obtained having a specific conductivity of 120, a sulfate concentration of about 34 mg/l, an aluminum concentration of about 4.4 mg/l and iron in a concentration of 0.112 mg/l.

Thus about 77.74% by volume of aluminum values were recovered in the 5030 ml of concentrate.

EXAMPLE 2

The procedure of Example 1 was followed except that the pressure in the separation vessel was maintained at 300 psi and the run carried out for about 11 minutes. The total sample of waste water treated was about 20,860 ml.

About 17,260 ml of permeate was obtained having a sulfate concentration of 44 mg/l and an aluminum concentration of 6.2 mg/l. This solution had a specific conductivity of 130. Thus the recovery of aluminum in the concentrate was about 82.74%.

EXAMPLE 3

The procedure of Example 1 was followed except that the pressure was maintained at 300 psi for most of the run, and was then increased to 600 psi near the end of the run. The waste water sample treated was about 30,438 ml. About 25,688 ml of permeate was obtained having an aluminum concentration of about 5.6 mg/l and a sulfate concentration of about 40 mg/l. This permeate solution had a specific conductivity of 120. Thus the recovery of aluminum in the concentrate was about 84.39% by volume.

EXAMPLE 4

The permeate obtained from Examples 2 and 3 were combined and passed into the pressure vessel of Example 1 at 300 psi pressure. The total sample treated was about 43,670 ml.

The second pass of the permeate solutions through the second membrane produced 38,750 ml of permeate having a pH of 4.8; a specific conductivity of 12; a sulfate concentration of 1 mg/l; an aluminum concentration of 0.50 mg/l; and an iron concentration of 0.022 mg/l. Thus the total recovery of aluminum values in the concentrate was about 88.73% by volume and two passes through the semi-permeable membrane brought the aluminum concentration well below the present-day requirements of the State of Florida of 1.48 mg/l.

The combined permeate solution from the second pass was treated with soda ash and filtered. The resultant aqueous solution contained only 0.23 ppm of aluminum and 44 ppm of sulfate. This solution is pure enough to be passed directly into public waterways.

The combined concentrate solution contained about 17% of aluminum. This solution can be reused directly in manufacturing alum solutions.

FIG. 1 is a flow diagram of a system suitable for carrying out a preferred embodiment of the present process. Referring to the FIGURE, the system 100 comprises an inlet 1 for a waste water feedstock stream which is to be purified. The feedstock stream is fed into pressure vessel 2 in which a semi-permeable membrane 3 is mounted. The concentrate stream is withdrawn from the vessel 2 through a pipe 4 and fed to a second pressure vessel 5 in which is mounted a semi-permeable membrane 6. The concentrate stream is withdrawn from pressure vessel 6 through a pipe 7. This concentrate contains 15–17% of aluminum and can be re-used as desired.

The permeate from vessel 2 is withdrawn through a pipe 8 and combined with the permeate from vessel 5 through a pipe 9 and passed into pressure vessel 10, also containing a semi-permeable membrane 11 mounted therein. The permeate stream from vessel 10 is withdrawn through a pipe 12. This purified stream can be discharged or otherwise used as desired.

The concentrate from vessel 10 is withdrawn through a pipe 13 and can be added to the original feedstock stream pipe for further concentration.

Typically a feedstock stream of 144,000 gal/day is pumped into the first pressure vessel. About 53,632 gal/day of concentrate is obtained using a pressure of between 300–500 psi, in which about 65% of the initial amount of aluminum is recovered in the concentrate. When this stream is passed through a second pressure vessel having a higher pressure of 500–1000 psi, an additional 60% recovery of aluminum is achieved, to produce a concentrate solution containing about 15-17% of aluminum.

The permeate solutions from both the first (99,072 gal/day) and the second (32,082 gal/day) pressure vessels are combined and fed to a third pressure vessel under pressure of 250 psi. A total of about 95% of the total aluminum values present in the initial waste water solution is removed by this multiple step process.

The final permeate (122,400 gal/day) is almost pure water which can be used or discharged as desired.

When contaminated ground water is used as the starting material, it generally contains a relatively high amount of iron which is desirably removed because iron forms iron oxides which precipitate out, contaminating the equipment and depositing it on the semi-permeable membranes. Thus the feedstock water can be treated in a premix tank with an antioxidant. Suitable antioxidants include sodium and potassium sulfites and bisulfites or sulfur dioxide. Preferably, sodium metabisulfite is added as the antioxidant to minimize oxidation of iron and subsequent precipitation of iron oxides during reverse osmosis processing. The feedstock is also generally filtered prior to passing into the first pressure vessel to remove insolubles prior to treatment in accordance with the invention.

The present process does not require the addition of any reagents to process waste waters that must thereafter be removed or otherwise disposed of, nor does it require an increase in the number of process steps that must be performed in order to obtain water of dischargeable purity. The dischargeable water obtained by the present process contains low levels of aluminum (about 0.23 ppm) and of sulfate ion (about 44 ppm), which level meets or exceeds all present-day standards for drinking water. Further, the concentrate solution contains high levels of aluminum, about 17%, which can be recycled directly to further alum manufacturing.

Although the present invention has been described in terms of certain embodiments, variations in the number of passes through a semi-permeable membrane, pressure and types of membrane employed can be made, as will be known to those skilled in the art, and are meant to be included herein. The invention is only to be limited by the scope of the appended claims.

We claim:

1. A process for purifying aluminum and sulfate-containing waste water which comprises passing said waste water solutions through a semi-permeable reverse osmosis membrane under pressure to produce a purified aqueous solution permeate and an aqueous solution concentrated in aluminum and sulfate ions.

2. A process according to claim 1 wherein the initial concentration of sulfate is from about 2000 to about 80,000 mg/l and the concentration of sulfate in the permeate stream is from about 4 to about 400 mg/l.

3. A process according to claim 1 wherein the initial concentration of aluminum is from about 200 to about 10,000 mg/l and the concentration of aluminum in the permeate stream is from about 1.0 to about 40 mg/l.

4. A process according to claim 1 wherein the pressure can be from 200-1000 psi.

5. A process according to claim 1 wherein the permeate is passed through a second semi-permeable membrane.

6. A process according to claim 1 wherein the concentrate is recycled to an alum manufacturing process.

7. A process wherein the aqueous solution of claim 1 concentrated in aluminum and sulfate ions is used for manufacturing alum by digestion of aluminum-containing ores with sulfuric acid and wherein said aqueous solutions is added to adjust the concentration of aluminum and sulfate in said alum solution.

8. A process for removing aluminum and sulfate ions from aqueous feedstocks comprising
   1) passing the feedstock through a semi-permeable membrane in a first pressure vessel, thereby forming a first permeate stream and a first concentrate stream;
   2) passing the first concentrate stream through a semi-permeable membrane in a second pressure vessel, thereby forming a second permeate stream and a second concentrate stream;
   3) combining said first and second permeate streams;
   4) passing said combined permeate stream through a semi-permeable membrane in a third pressure vessel, thereby forming a third, highly purified permeate stream and a third concentrate stream; and
   5) discharging said third permeate stream.

9. A process according to claim 8 wherein said second concentrate stream contains from about 15-17% by volume of aluminum.

10. A process according to claim 9 wherein said second concentrate stream is recycled to an alum manufacturing process.

11. A process according to claim 8 wherein said third concentrate stream is combined with said feedstock stream.

12. A process according to claim 8 wherein prior to passing said feedstock into said first pressure vessel, it is treated with an antioxidant and filtered.

13. A process wherein the third concentrate stream of claim 12 is used for manufacturing alum by digestion of aluminum-containing ores with sulfuric acid and wherein said third concentrate is used to adjust the concentration of aluminum and sulfate in said alum solution.

14. A process according to claim 12 wherein said antioxidant is selected from the group consisting of sodium or potassium sulfite and bisulfites and sulfur dioxide.

15. A process according to claim 12 wherein said antioxidant is sodium metabisulfite.

16. A process according to claim 8 wherein the second concentrate stream is recycles to an alum manufacturing process.

17. A process according to claim 12 wherein the second concentrate stream is recycles to an alum manufacturing process.

18. A process according to claim 8 wherein said combined permeate streams are treated with soda ash and filtered prior to discharge of said stream.

19. A process wherein the third concentrate stream of claim 8 is used for manufacturing alum by digestion of aluminum-containing ores with sulfuric acid and wherein said third concentrate stream is added to adjust the concentration of aluminum and sulfate in said alum solution.

* * * * *